United States Patent [19]

Stoessel et al.

[11] 4,073,377
[45] Feb. 14, 1978

[54] FEED ROLLS HAVING AUTOMATIC SPEED CONTROL

[75] Inventors: Herman V. Stoessel; Daniel R. Prichard, both of Wichita, Kans.

[73] Assignee: Hesston Corporation, Hesston, Kans.

[21] Appl. No.: 678,499

[22] Filed: Apr. 20, 1976

[51] Int. Cl.$^2$ .............................................. B65G 17/00
[52] U.S. Cl. ................................ 198/624; 198/856; 241/222
[58] Field of Search ............... 198/507, 512, 518, 573, 198/577, 624, 856, 625–628, 638, 639, 642, 511, 513–516, 454, 461, 462; 214/84; 56/10.9, 11.2, 11.9, DIG. 1, 11.1, 10.2; 241/34, 222, 223, 280; 271/263, 202

[56] References Cited

U.S. PATENT DOCUMENTS

| | | | |
|---|---|---|---|
| 3,073,099 | 1/1963 | Andersen | 56/11.1 |
| 3,470,681 | 10/1969 | Saemann | 56/10.2 |
| 3,511,287 | 5/1970 | Hoch et al. | 241/280 |
| 3,523,411 | 8/1970 | Waldrop et al. | 56/DIG. 1 |
| 3,613,336 | 10/1971 | Smith | 56/10.9 |
| 3,840,224 | 10/1974 | Zawiski | 271/263 |

Primary Examiner—John J. Love
Assistant Examiner—Joseph E. Valenza
Attorney, Agent, or Firm—Schmidt, Johnson, Hovey & Williams

[57] ABSTRACT

The shiftably supported, rotatable feed rolls on a forage harvester or other material processing machine are operably coupled to a control lever on the hydraulic pump regulating the feed roll drive motor such that the angular velocity of the rolls is increased in response to shifting movement of the rolls away from one another, thereby enabling the rolls to readily rid themselves of a larger-than-normal slug of material should the same be encountered during harvesting. An additional control lever of a second hydraulic pump regulating another drive motor for the standing crop cutter and gathering elements of the harvester is operably coupled to the first control lever by a lost motion connection that permits the control levers to be shifted simultaneously for in unison manual operation of the motors, yet the first lever may be actuated independently by the feed rolls to control the first drive motor in response to relative shifting movement between the rolls. The linkage operably coupling the shiftable rolls and the first control lever has motion dissipating means to permit in unison movement of the levers without shifting the rolls. Two embodiments present alternative forms of actuating linkage for the pump levers.

28 Claims, 8 Drawing Figures

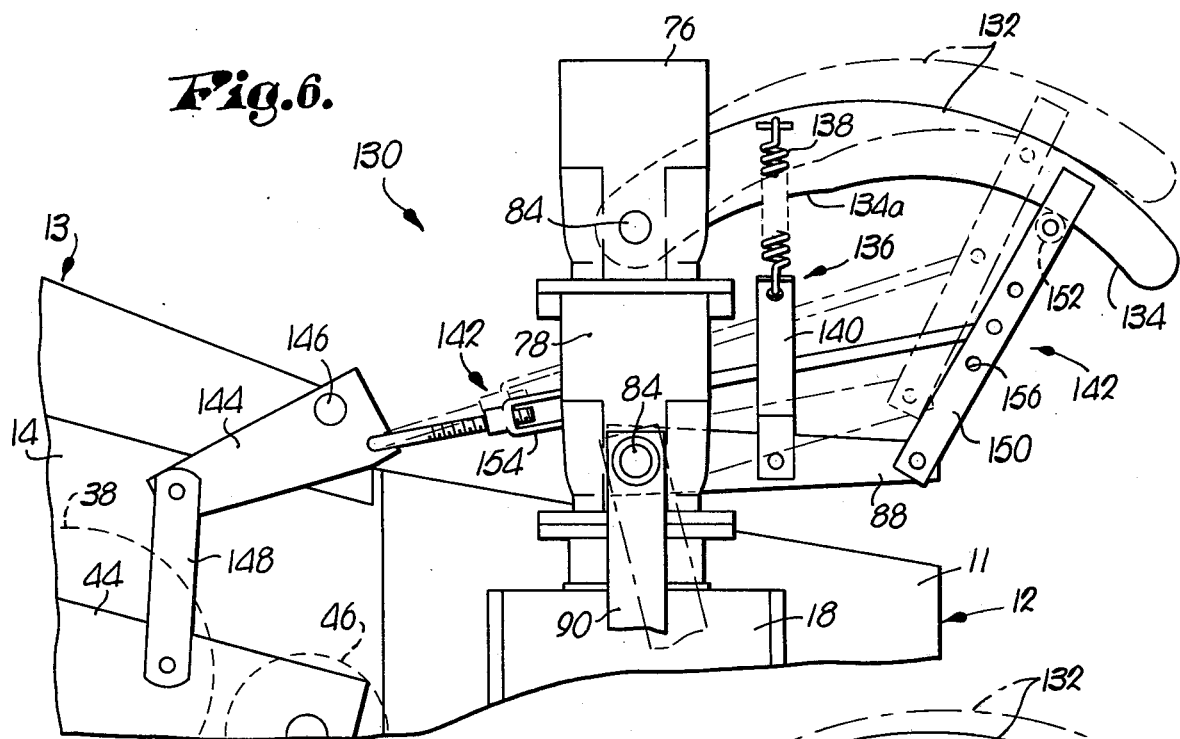
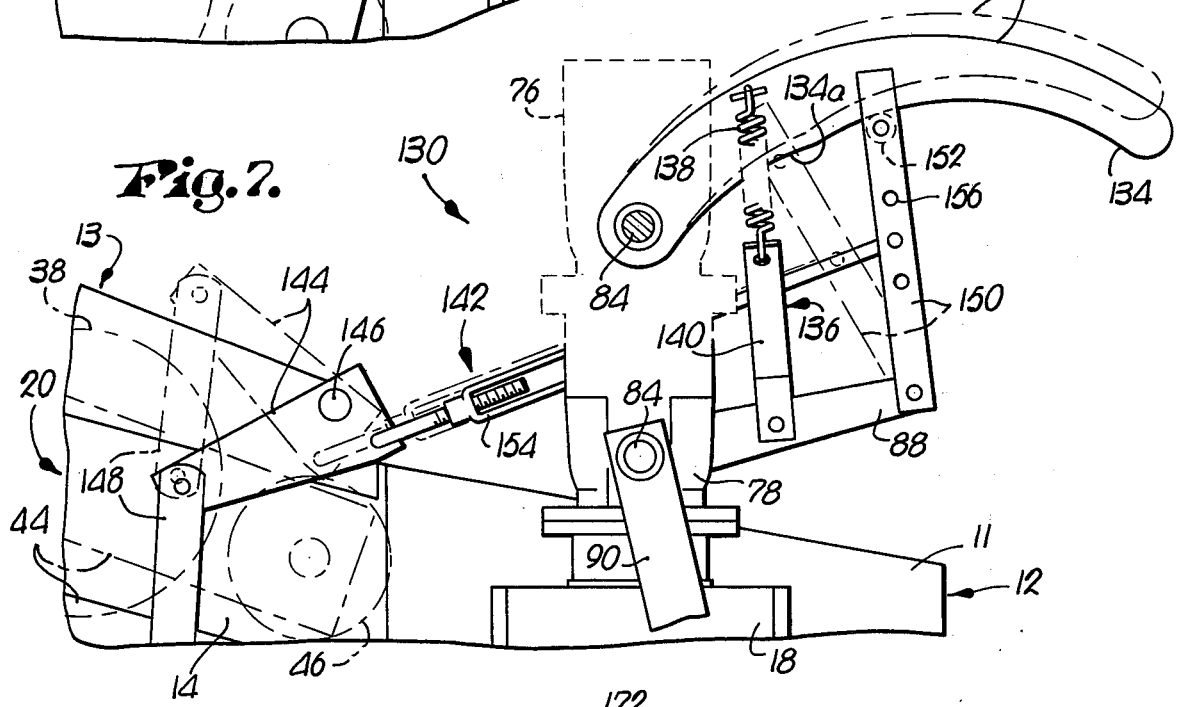
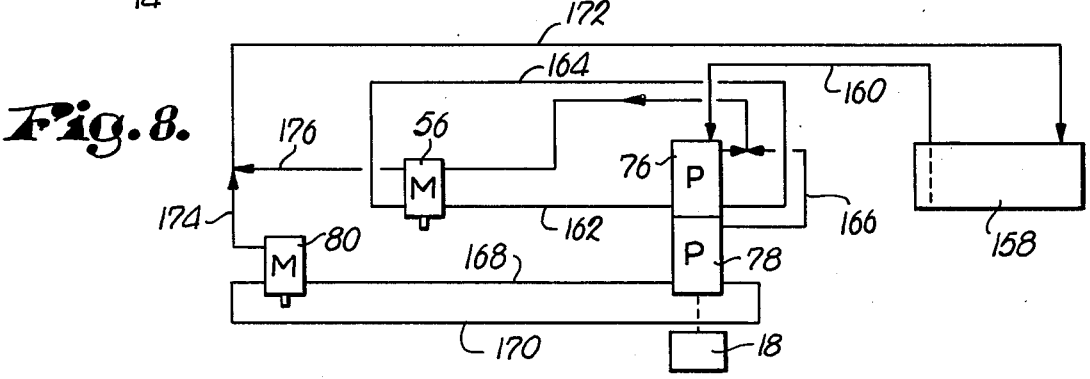

FEED ROLLS HAVING AUTOMATIC SPEED CONTROL

This invention relates to control devices in general, and particularly concerns a control for a material handling apparatus having banks of shiftable, rotatable feed rolls whereby the rotational speed of the rolls may be manually controlled simultaneously with other driven structure in the apparatus while at the same time allowing automatic speed control in response to shifting movement of the banks of rolls toward and away from one another.

Material handling machines, such as forage harvesters and the like, are typically provided with banks of rotating feed rolls for forcibly projecting material into a powered chopper. The rolls of one bank are normally rotated in a direction opposite to the rolls of the opposing bank such that material is conveyed between the banks, and the banks are sometimes rendered shiftable toward and away from one another to allow large masses or slugs of material to pass between the banks without jamming the feeding apparatus or causing damage to the rolls themselves.

In forage harvesters severed crop stalks are presented to the feed rolls by gathering elements which typically converge rearwardly to a relatively narrow throat at the feed rolls. This area can fairly easily become clogged with tangled, disoriented masses of heavy stalks that are all trying to pass through the narrow throat at the same time, depending upon the ground speed of the harvester, the speed of the gathering elements, crop moisture conditions, and other factors. Consequently, it is not unusual for the feed rolls to encounter more slugs of material on a sporadic basis than they can effectively handle, notwithstanding their ability to separate from one another in order to pass the slugs. This forces the operator to momentarily stop the forward progress of the harvester or, in severe cases, even necessitates a complete shutdown to clear material from between the clogged feed rolls. This condition is not only annoying to the operator but also greatly reduces the operating efficiency of the forage harvester.

Accordingly, it is an important object of the present invention to provide a processing machine with means for clearing undesired material buildup from between operating rolls automatically and without the need for interrupting machine operation.

In light of the foregoing object, it is another important object of the present invention to provide a speed control for the relatively separable feed rolls of a forage harvester or the like which is responsive to shifting movement of the rolls toward and away from one another so as to momentarily increase their speeds of rotation during separation to pass large slugs of material.

It is another important object of our invention to provide a control as above which is operably coupled with one or more other speed controls for in unison manual operation thereof, yet which at the same time remains independently and automatically actuatable in response to separation of the feed rolls.

It is yet another important object of the instant invention to provide a control as above whereby the two controls may be operated in unison without causing shifting movement of the feed rolls.

As a corollary to the above object, it is another important object of the present invention to provide a linkage operably coupling the shiftable rolls with their respective speed control device wherein the linkage has a motion dissipating means such that it may be operated without shifting the rolls.

In the drawings:

FIG. 6 is a partial, side elevational view of a processing machine having a second embodiment of the present invention installed thereupon;

FIG. 7 is a partial, side elevational view of the machine in FIG. 6, showing a second operating position; and FIG. 8 is a schematic view of the hydraulic system usable with either embodiment.

Figure 1:
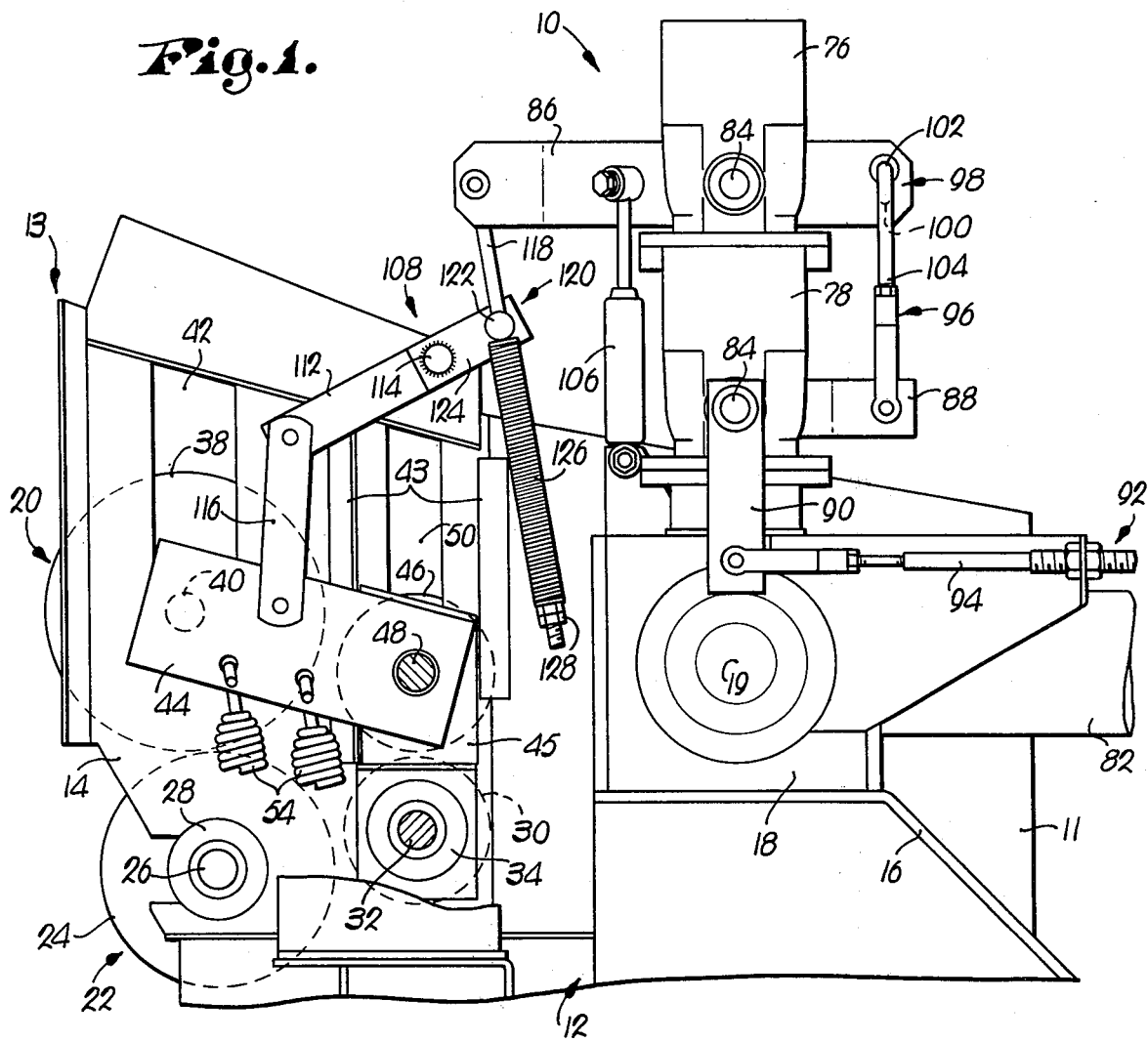
FIG. 1 is a partial, side elevational view of a processing machine having installed thereupon apparatus constructed in accordance with the principles of the present invention.
Figure 3:
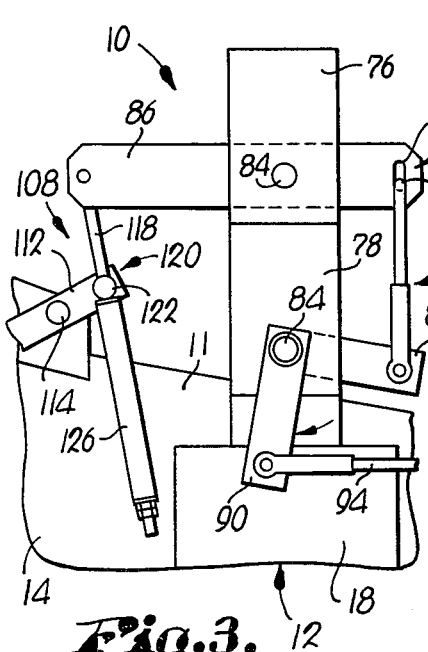
FIG. 3 is a partial, schematic view of the apparatus showing the controls in their approximate neutral position.

A material feeding apparatus 10 is shown in FIG. 1 mounted on a framework 12 forming a part of a forage harvester which is only partially illustrated in the drawing. While a forage harvester has been selected for the purpose of illustrating the present invention, it is to be understood that the principles disclosed herein may be applied to any number of processing machines.

Figure 2:
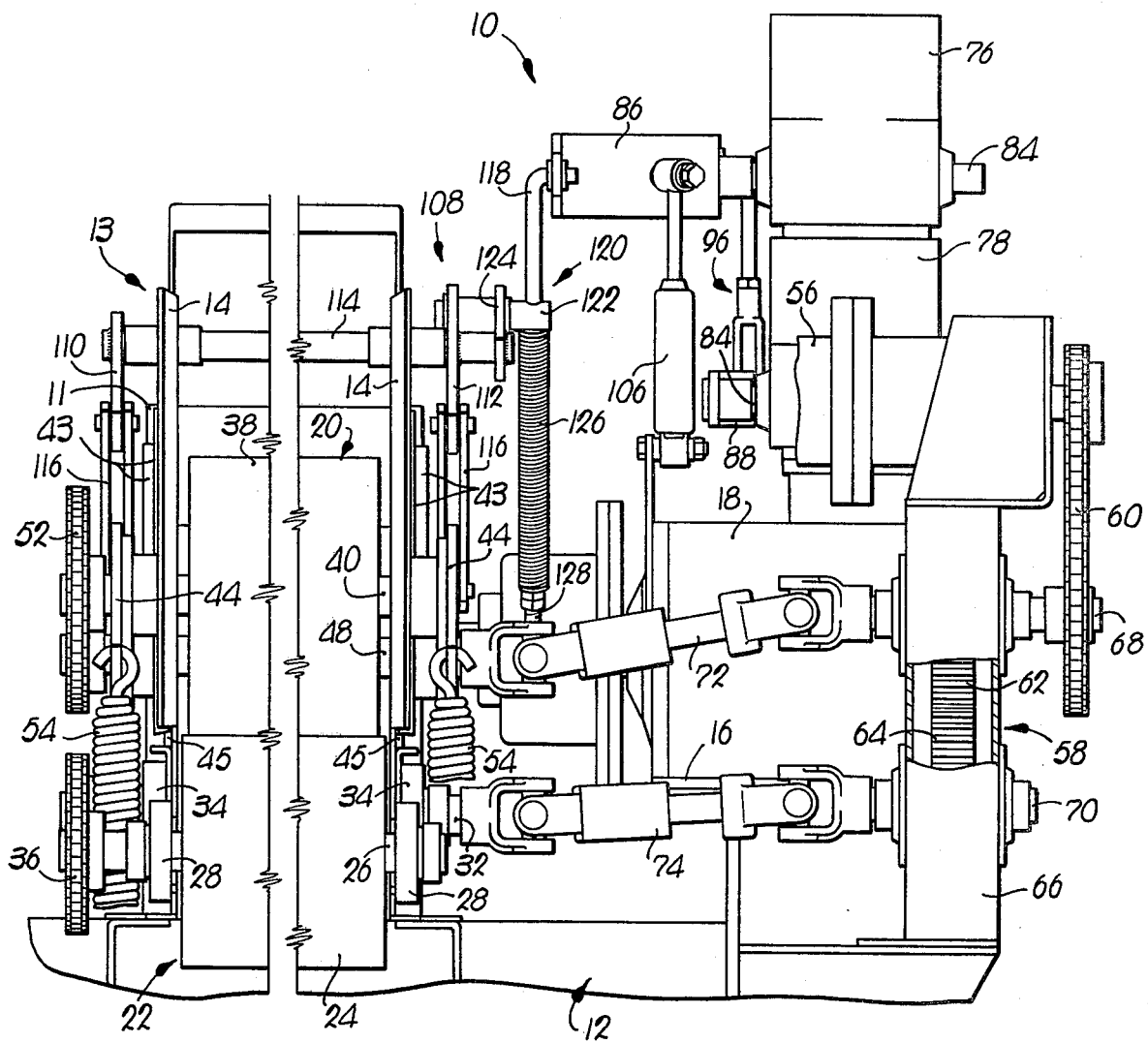
FIG. 2 is a partial, front elevational view of the machine.

Framework 12 includes a chopper box 11 containing a cutting cylinder (not shown), and a forwardly disposed feed roll housing 13 having a pair of opposed, upright, spaced, parallel sidewalls 14. A laterally extending mounting plate 16 supports a gearbox 18 and associated structure to be described hereinbelow. A transverse shaft (not shown) having its axis of rotation at 19 in FIG. 1 leads from gearbox 18 into the chopper box 11 to drive the aforementioned cutting cylinder. Apparatus 10 includes upper and lower feed roll assemblies 20 and 22, which extend transversely between sidewalls 14. The lower feed roll assembly 22 has a large forward roll 24 supported for rotation by a shaft 26 which is journaled at opposite ends in sidewalls 14 by a pair of bearings 28 and an aft-roll 30 supported for rotation by a shaft 32 which is similarly journaled in sidewalls 14 by a pair of bearings 34. Shafts 26 and 32 are intercoupled at one end by a chain and sprocket assembly 36 (FIG. 2) for simultaneous rotation of rolls 24 and 30.

The upper feed roll assembly 20 overlies feed roll assembly 22 and includes a forwardmost roll 38 supported for rotation by a transversely extending shaft 40. The opposite ends of shaft 40 project through upright slots 42 formed in sidewalls 14 and are journaled by a pair of respective end plates 44. Similarly, a rearmost roll 46 is supported by a shaft 48 which extends through upright slots 50 formed in sidewalls 14 and is journaled at opposite ends by end plates 44. Shafts 40 and 48 are intercoupled at one end by a chain and sprocket assembly 52 (FIG. 2) for unidirectional rotation of rolls 38 and 46.

It should be noted from the foregoing description that the upper feed roll assembly 20 is shiftable toward and away from the lower feed roll assembly 22 by virtue of the fact that shafts 26 and 32 are rigidly secured to sidewalls 14 while shafts 40 and 48 are free to move in slots 42 and 50, respectively. While the upper feed roll assembly 20 is free to move vertically within slots 42 and 50, the assembly 20 is yieldably biased toward a lowered position as shown in FIG. 1 by two pairs of coiled springs 54 which extend between end plates 44 and sidewall 14. As seen in FIG. 1, when the upper feed roll assembly 20 is in its normal lowered position, forwardmost roll 38 is closely adjacent forward roll 24 while rearmost roll 46 is closely adjacent roll 30.

Each sidewall 14 has a pair of spaced, upright guides 43 (FIG. 1) extending laterally therefrom adjacent slot 50 for receiving a respective wear plate 45 (FIG. 1) rigidly secured to an associated plate 44. The guides 43 form a track for the plates 45 such that upper feed roll assembly 20 is limited to a substantially vertical path of travel.

Rolls 24, 30, 38 and 46 are rotated by a power train which includes a hydraulic motor 56 (FIGS. 1 and 8) rigidly secured to framework 12 above gearbox 18. The power shaft of motor 56 is operably coupled to a gear assembly 58 by a chain and sprocket assembly 60. The gear assembly 58 has a pair of intermeshed gears 62 and 64 supported for rotation in gear housing 66 by a pair of respective shafts 68 and 70. One end of shaft 68 is mechanically coupled with shaft 48 by a double U-jointed coupling 72 for transmitting rotational movement to the rolls 38 and 46. A similar coupling 74 extends between shafts 70 and 32 to drive the lower assembly 22.

The above-described mechanical drive between hydraulic motor 56 and the feed roll assemblies 20 and 22 functions to rotate the rolls of assembly 20 in a direction opposite to the rolls in assembly 22. Under normal forward operating conditions, motor 56 would be powered such that rolls 38 and 46 are driven in a counterclockwise direction, as viewed in FIG. 1, while rolls 24 and 30 are driven in the opposite or clockwise direction. In this manner, material introduced between rolls 24 and 38 is forced rearwardly between the roll assemblies 20 and 22.

Hydraulic motor 56 is powered by a variable displacement hydraulic pump 76 mounted in an upright position overlying gearbox 18. For drawing clarity, the various hydraulic lines have been deleted from the FIGS. 1-7, though it is to be understood that the pump 76 is hydraulically coupled to motor 56 in a manner shown in the schematic diagram of FIG. 8. In the preferred embodiment, pump 76 is mounted in tandem with a second variable displacement hydraulic pump 78 which powers a second hydraulic motor 80 (FIG. 8 only) for driving a gathering mechanism (not shown) and a standing crop cutter (not shown) for example. The tandem arranged pumps 76 and 78 are mechanically driven by a vertical output shaft (not shown) from the gearbox 18 which is, in turn, driven by the main fore-and-aft drive shaft (not shown) carried within a housing 82. Pumps 76 and 78 are of conventional construction having an internal swashplate (not shown) for controlling the output thereof. Each of the pumps 76 and 78 has a transversely extending, axially rotatable rod 84 coupled to the internal swashplate and projecting through the pumps 76 and 78 such that the swashplate may be externally controlled by merely twisting rods 84.

Pump 76 has a control lever 86 secured to its rod 84 for swinging movement therewith while pump 78 has a similar control lever 88 mounted on one end of rod 84 for swinging movement therewith. Pump 78 also has a main lever 90 mounted on the opposite end of its rod 84 such that the output of pump 78 may be controlled by swinging either control lever 88 or main lever 90. Lever 90 forms a part of a main throttle control 92 which also includes a cable 94 extending between lever 90 and the operator area of the forage harvester (not shown) whereby operation of the cable assembly 94 causes swinging of main lever 90. It is important to note that levers 88 and 90 swing in unison due to their rigid connections to their common rod 84.

Levers 86 and 88 are operably intercoupled by a connector 96 such that pumps 76 and 78 are controlled in unison. A lost motion coupling 98 secures one end of connector 96 to control lever 86 and includes an elongate, generally vertical slot 100 formed in lever 86 and a lateral projection 102 on connector 96 slidably retained within the slot 100. The length of connector 96 may be adjusted by bolt and nut assembly 104; in the preferred embodiment, the length of connector 96 is adjusted such that when projection 102 is positioned at the uppermost end of slot 100, the levers 86 and 88 are substantially parallel. At this point, it should be explained that levers 86 and 88 are so arranged that when in a substantially horizontal position, as shown in FIG. 1, the respective pumps 76 and 78 are in a neutral position. Movement of levers 86 and 88 in a counterclockwise direction from the neutral position shown in FIG. 1 causes hydraulic motors 56 and 80 to operate in a normal or forward direction. Conversely, movement of the levers 86 and 88 in a clockwise direction from the neutral position causes reverse operation of motors 56 and 80. It is also important to note that when main lever 90 is swung in a counterclockwise direction by manual operation of the cable assembly 94, the lateral projection 102 on connector 96 will move to the uppermost end of slot 100, whereupon levers 88 and 86 will move in unison and remain parallel to one another. However, when lateral projection 102 is in its uppermost position along slot 100, as shown for example in FIG. 4, lever 86 may be swung further in the counterclockwise direction without affecting the position of lever 88 due to the lost motion of projection 102 within slot 100. In order to prevent random, sporadic movement of lever 86 relative to lever 88, a shock absorber assembly 106 extends between lever 86 and framework 12.

A linkage 108 operably couples control lever 86 with upper feed roll assembly 20 for automatic control of hydraulic motor 56 in response to vertical shifting movement of the assembly 20. Linkage 108 includes a pair of laterally spaced rocker arms 110 and 112 on opposite sides of the feed roll housing which are rigidly secured to opposite ends of a common transversely extending torque shaft 114 that is journaled by sidewalls 14. Each rocker arm 110 and 112 is operably connected to its corresponding plate 44 by a crank link 116. The rear end of rocker arm 112 is coupled to the forward end of lever 86 by a connecting link 118.

Motion dissipating means in the form of a slider connection 120 between rocker arm 112 and connecting link 118 permits shifting movement of the latter relative to arm 112. Slider connection 120 comprises an axially rotatable, transversely apertured pinion 122 mounted on arm 112 and captively receiving connecting link 118 for sliding movement therealong. In the preferred embodiment, the mounting of pinion 122 is augmented by a brace member 124 secured to rod 114 and extending parallel to arm 112. The movement of slider connection 120 is limited in one direction by a coil spring 126 coaxially positioned on link 118 below pinion 122 and between the latter and the end of link 118 remote from control lever 86. Tension in spring 126 may be adjusted by a threaded assembly 128 provided on the remote lower end of link 118.

Figure 4:
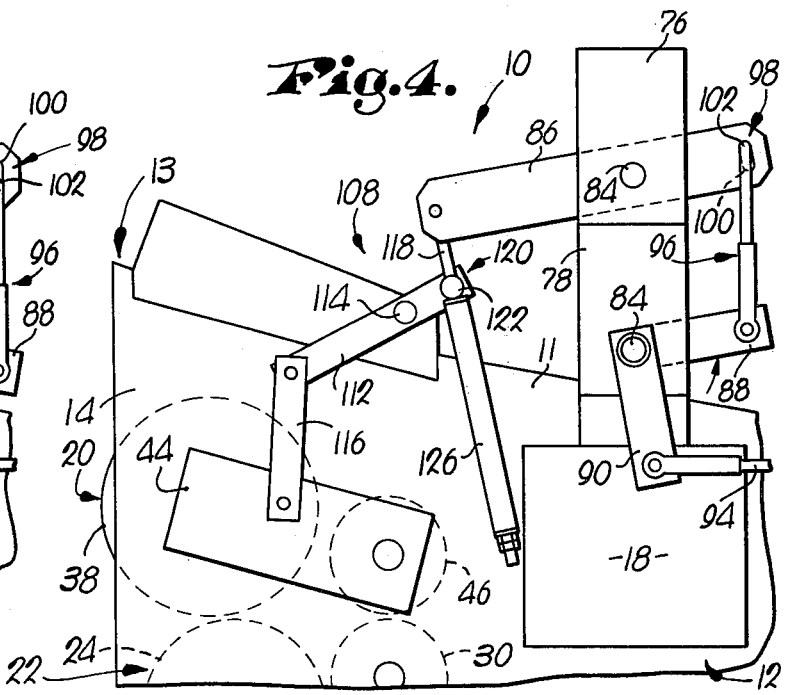
FIG. 4 is a partial, schematic view of the apparatus showing the controls in their forward position with the feed rolls in their normal operating position.
Figure 5:
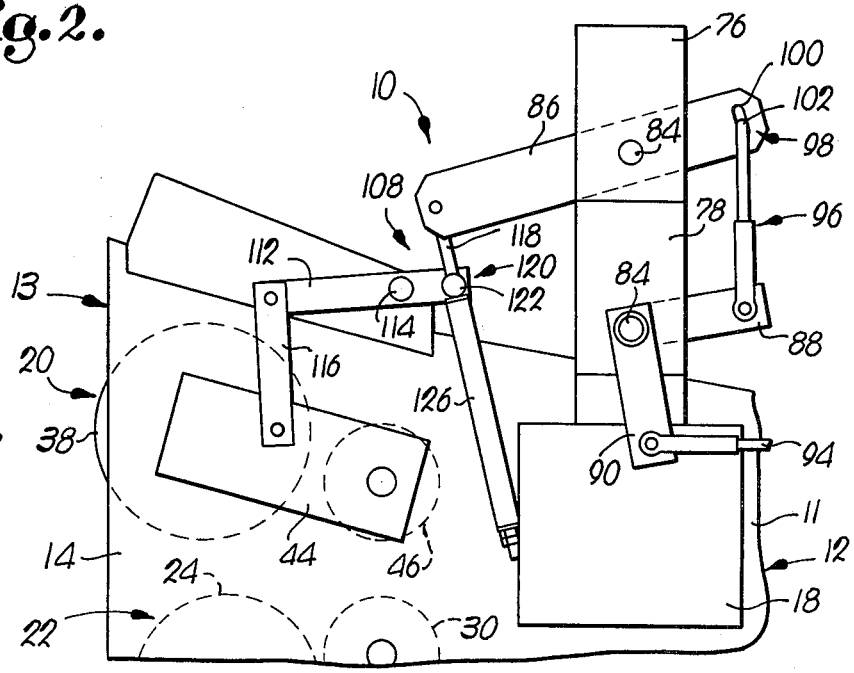
FIG. 5 is a partial, schematic view of the apparatus showing the controls in their forward position with the rolls vertically separated.

As shown in FIGS. 4 and 5, linkage 108 is arranged such that upward shifting movement of upper feed roll assembly 20 away from lower feed roll assembly 22 causes swinging movement of lever 86 in the counterclockwise direction whereby the speed of hydraulic motor 56 is increased in a manner described hereinabove. However, due to the lost motion coupling 98, the swinging movement of lever 86 does not change the position of lever 88, at least not within the limits of slot 100. Consequently, the speed of hydraulic motor 80 is unaffected by shifting movement of the assembly 20. Moreover, due to the slider connection 120 in linkage 108, main throttle control 92 may be operated to swing levers 86 and 88 in unison without affecting the relative position of the roll assemblies 20 and 22. In this connection, it is to be understood that the retaining force of springs 54 on plates 44 is significantly greater than the biasing force of spring 126 such that movement of lever 86 in the clockwise direction merely pulls nuts 128 closer to pinion 122, thereby compressing spring 126 whereby no lifting movement is imparted to assembly 20.

A second embodiment of the present invention is shown in FIGS. 6 and 7, wherein is illustrated a material feeding apparatus 130. Apparatus 130 employs much of the same structure as apparatus 10 with the exceptions as described hereinbelow.

Hydraulic pump 76 has a generally upwardly arcuate control lever 132 rigidly secured to rod 84 for speed and direction control of hydraulic motor 56. Lever 132 includes a lower follower edge 134 facing lever 88 that has two distinct radii formed therealong for a purpose to be described hereinbelow.

Connector 136 operably couples levers 88 and 132 for in unison swinging movement thereof in response to actuation of main control 92. Shiftable means in the form of a coil spring 138 renders connector 136 extensible such that control lever 132 may be moved independently of lever 88 in addition to being movable in unison with the latter. As is shown in FIGS. 6 and 7, the spring 138 extends between lever 132 and a rigid link 140 pivotally secured to lever 88 and forming a part of the connector 136.

A linkage 142 operably couples upper feed roll assembly 20 with lever 132 such that the speed of hydraulic motor 56 is automatically responsive to shiftable movement of the assembly 20. The linkage 142 includes a bell crank 144 rigidly secured to a transversely extending torque rod 146 which is journaled by sidewalls 14 such that crank 144 is rotatable relative to framework 12. A connecting link 148 is pivotally secured to one end of crank 144 and extends to a pivotal mounting on end plate 44. Though not shown, it is to be understood that torque rod 146 extends beyond the opposing sidewall 14 and has a crank arm rigidly secured thereto coupled with a second connecting link 148 which extends between the arm and the other end plate 44. Linkage 142 also includes a cam arm 150 pivotally mounted at one end on lever 88 and carrying a rotatable wheel 152 adjacent the opposite end thereof. Wheel 152 is in operable contact with follower edge 134, the latter being yieldably biased toward the wheel 152 by action of coil spring 138. An adjustable turn-buckle link 154 extends between bell crank 144 and cam arm 150 such that pivotal movement of crank 144 with rod 146 causes swinging movement of the cam arm 150 about its mounting point on control lever 88. The arrangement of turn-buckle link 154 is such that when lever 88 is swung by actuation of the main throttle control 92, the link 154 merely pivots about its front mounting point on bell crank 144 whereby no motion is imparted to the upper feed roll assembly 20. Such front pivotal mounting point for the link 154 effectively becomes a pivotal joint in the entire linkage 142 that forms a motion dissipating means corresponding to the motion dissipating means of the first embodiment (connection 120).

At this juncture, it is important to understand the relationship between cam arm 150 and control lever 132, particularly the follower edge 134 of the latter. The cam arm 150 not only forms a part of the linkage 142 which operably couples lever 132 with upper feed roll assembly 20, but also cooperates with connector 136 to effect in unison swinging movement of levers 88 and 134 upon actuation of main throttle control 92. In this regard, it will be appreciated that the connector 136 cannot function to move lever 134 in a counterclockwise direction (as viewed in FIG. 6) due to the presence of coil spring 138. However, this shortcoming is compensated for by the presence of cam arm 150 which readily swings lever 134 in a counterclockwise direction when lever 88 is swung in the same direction by the operation of main throttle control 92. While cam arm 150 has no effect on lever 132 when lever 88 is moved in a clockwise direction, connector 136 is operable to swing lever 132 in the clockwise direction with lever 88, it being understood that the force required to extend spring 138 is much greater than the force resisting swinging movement of the control lever 132.

In viewing FIGS. 6 and 7, it will be seen that while levers 88 and 132 are swung in unison by actuation of throttle control 92, the levers 88 and 132 are not necessarily swung uniformly. In this connection, depending upon the position of wheel 152 along follower edge 134, control lever 132 may swing through a larger angle than control lever 88 when actuated by throttle control 92. The position of wheel 152 along edge 134 may be determined by adjusting the length of turn-buckle 154. Thus, for example, in comparing the positions of lever 132 in FIGS. 6 and 7, it may be seen that when turn-buckle link 154 is shortened as in FIG. 7, the control lever 132 is swung much farther in a counterclockwise direction for the same counterclockwise deflection of lever 88 than when the turn-buckle link 154 is extended as in FIG. 6. This particular feature may be desirable in forage harvesters or the like for permitting variation in the length of chop depending upon the type of crop material being processed. It is important to note that when the lever 88 is in a neutral position, as shown in solid lines in FIG. 6, swinging of cam arm 150 has no effect on the angular position of lever 132 since the arc of edge 134 corresponds to the path of travel of wheel 152. As a consequence, lever 134 will always return to a neutral position at the same time as lever 88 regardless of the length setting in turn-buckle link 154.

A second function of cam arm 150 is to swing lever 132 independently of lever 88 in response to pivotal movement of bell crank 144. Once lever 88 is moved from its neutral position, swinging movement of the cam arm 150 will cause swinging lever 132 since the arcuate path followed by wheel 152 no longer corresponds to the arc described by follower edge 134. Thus, for example (as shown in phantom in FIG. 6 and in solid lines in FIG. 7), when bell crank 144 is pivoted due to upward shifting of upper roll assembly 20, cam arm 150 swings wheel 152 along follower edge 134 causing lever 132 to move counterclockwise relative to lever 88. Of course, this movement will cause a momentary increase in the speed of rolls 24, 30, 38 and 46, as described hereinabove. Note that the connector 136 permits this relative swinging movement by extension of coil spring 138. Cam arm 150 is provided with a plurality of mounting apertures 156 for securing turn-buckle link 154 in any of a number of preselected positions along the length of the arm 150. This arrangement, plus the extensibility of link 154, provides versatility in setting up the desired geometrical relationship between the movement of bell crank 144 and the corresponding movement of control lever 132.

Turning now to FIG. 8, the hydraulic system of the present invention is shown schematically having as major components the pumps 76 and 78 arranged in tandem and the respective associated hydraulic motors 56 and 80. Hydraulic fluid is drawn from a reservoir 158 through a hydraulic line 160 to pump 76. The pump 76 forces fluid through a closed circuit defined by a hydraulic line 162 leading from pump 76 to motor 56 and a return line 164 leading from the motor 56 to the return port of pump 76. Pump 76 functions also as a charge pump and has a hydraulic line 166 extending therefrom to pump 78 for forward flow of fluid between the pumps 76 and 78. Pump 78 has a closed hydraulic circuit with motor 80 which includes a hydraulic line 168 extending from pump 78 to motor 80 and a return line 170 leading from motor 80 to pump 78. The leakage line 172 returns oil to reservoir 158 and is fed by a hydraulic line 174 leading from motor 80 and a similar hydraulic line 176 leading from motor 56.

Using the embodiment of FIGS. 1-5 as an example, when control lever 86 is moved in the counterclockwise direction, as viewed in FIG. 1, fluid is caused to flow from pump 76 through line 162 to motor 56 and return to pump 76 through line 164. Of course, the greater the extent of counterclockwise rotation of control arm 86, the larger the volume of fluid that flows through conduit 162 and, consequently, the greater the forward speed of motor 56. Similarly, counterclockwise swinging of control lever 88 will cause fluid to flow from pump 78 through hydraulic line 168 to motor 80 and return from motor 80 to pump 78 through return line 170. Conversely, swinging lever 86 in the clockwise direction will cause the fluid to flow from pump 76 through line 164 to motor 56 and return from motor 56 to pump 76 and through hydraulic line 162 such that the direction of motor 56 is the reverse of the above-described direction. A similar reverse direction of motor 80 may be accomplished by swinging lever 88 in the clockwise direction to cause a reversal of fluid flow from pump 78 to motor 80.

In operation of the first embodiment of the present invention, the operator first sets the main throttle control 92 such that levers 86 and 88 are swung from their neutral positions, shown in FIG. 1, to a forward operating position similar to that shown in FIG. 4. As previously described, this movement will take place substantially in unison as lever 90 is swung counterclockwise and will result in the lateral projection 102 on connector 96 being positioned in the uppermost end of slot 100 on lever 86. With lever 86 in this position, the lower rolls 24 and 30 will be driven in a clockwise direction (as viewed in FIG. 1), while the upper rolls 38 and 46 will be driven in a counterclockwise direction such that material introduced between rolls 38 and 24 will be projected rearwardly between the upper feed roll assembly 20 and the lower feed roll assembly 22. At the same time, the corresponding position of lever 88 will cause pump 78 to drive motor 80 in a forward direction at a predetermined rate of speed. Thus, for example, if motor 80 is coupled to gathering elements which deliver material to the feed roll assemblies 20 and 22, the operating speeds of these components will be synchronized due to the operable coupling between control levers 86 and 88.

Should a condition be encountered wherein material begins to buildup between the feed roll assemblies 20 and 22 such that they are in danger of becoming clogged, the buildup will exert an upward pressure on feed roll assembly 20 causing the latter to shift upwardly away from the stationary lower feed roll assembly 22, as shown schematically in FIG. 5. In viewing FIG. 5, it may be seen that the upward shifting of feed roll assembly 20 causes clockwise movement of rocker arm 112 which, in turn, effects counterclockwise swinging of lever 86. As explained hereinabove, the additional counterclockwise movement of lever 86 increases the speed of motor 56 and, consequently, increases the angular velocity of rolls 24, 30, 38 and 46. Increased speed of the rolls causes material to move rearwardly between roll assemblies 20 and 22 at a greater rate such that any material buildup between assemblies 20 and 22 will be reduced in a short period of time, provided that the rate material is being delivered to the roll assemblies 20 and 22 is not also increased. Note that, as described hereinabove, the counterclockwise swinging of lever 86 caused by upward shifting of feed roll assembly 20 has no effect on control lever 88 because of the presence of lost motion coupling 98 between lever 86 and connector 96. In this connection, counterclockwise movement of lever 86 merely causes the lateral projection 102 on connector 92 to move from its position adjacent the uppermost end of slot 100 to a new position adjacent the lowermost end of the latter. As the buildup of material is removed from between the roll assemblies 20 and 22, the apparatus 10 returns to a position approximating that represented in FIG. 4 whereupon the angular velocity of rolls 24, 30, 38 and 46 returns to normal due to the clockwise swinging movement of lever 86 as assembly 20 moves toward assembly 22.

The operation of the second embodiment of the present invention is the same in principle as that of the first embodiment. However, there are differences in the precise way in which the principle is carried out as a result of the "cam operation" of the pump lever 132 in the embodiment of FIGS. 6 and 7.

With both of the levers 88 and 132 raised to their dotted line positions of FIG. 6 so as to place the feed rolls 24, 30, 38 and 46, plus the gathering elements, in a "forward mode", vertical displacement of the upper feed roll assembly 20 caused by a slug of material will pull the cam arm 150 forwardly along follower edge 134 such as to shift the pump lever 132 upwardly relative to the lower pump lever 88. This instantly increases the angular velocity of the feed rolls 24, 30, 38 and 46, while keeping the operating speed of the gathering elements constant, to thereby project the slug of material with increased speed and force rearwardly into the chopper. Once the troublesome slug has been cleared, return of the upper assembly 20 to its normal position by the return springs 52 pushes the cam arm 150 rearwardly along edge 134 whereby to allow the upper pump lever 132 to return to its previous position under the action of coil spring 138.

FIG. 7 illustrates the action of the cam arm 150 when the latter is adjusted to a position along the follower edge 134 closer to the rod 84 of upper pump 76 than that shown in FIG. 6. Such relatively forward positioning of the cam arm 150 (by adjusting the turn-buckle 154) has the effect of swinging the upper pump lever 132 higher than in FIG. 6 through the same upward displacement of the lower pump lever 88. Hence, the effect is to have the feed rolls 24, 30, 38 and 46 rotating at faster speeds than in the FIG. 6 arrangement, although the gathering elements present crops to the feed rolls 24, 30, 38 and 46 at the same rate of speed. Crops are thereby projected rearwardly into the chopper at a greater speed, hence increasing the length of cut of the crop segments obtained by the chopper.

If the upper feed roll assembly 20 is shifted upwardly in response to encountering a slug of material, the effect on the cam arm 150 when adjusted to the position as in FIG. 7 is the same as when it is adjusted to its FIG. 6 position. In both cases the effect is to raise the pump lever 132 such as to speed up the feed rolls 24, 30, 38 and 46. This speed increase on the part of the feed rolls 24, 30, 38 and 46 only takes place over a limited vertical travel of the upper feed roll assembly 20, because when the upper assembly 20 is displaced to the extent shown in dotted lines in FIG. 7, for example, the roller 152 on the cam arm 150 slips into a second segment 134a of the follower edge 134 closely adjacent the pump rod 84. Segment 134a is so contoured that it is concentric with the axis swinging movement of the cam arm 150 when the lower pump lever 88 is in its raised position as illustrated in FIG. 7. Accordingly, any movement of the cam arm 150 within the arcuate segment 134a has no further effect on the pump lever 132. Hence, even though the upper feed roll assembly 20 may continue to rise in order to clear the slug of material, the speed of rotation of the feed rolls 24, 30, 38 and 46 has reached its maximum and will increase no more.

From the foregoing description of structure and operation, it is apparent that the present invention provides a unique and effective means for reducing clogging problems in all types of material processing machines. Operably coupling the shiftable upper feed roll assembly 20 with the speed regulator controlling the angular velocity of the feed rolls presents a highly efficient manner of automatically clearing troublesome buildups from between the roll assemblies 20 and 22. With this arrangement, there is assured continuous maintenance-free operation of the feeding unit regardless of the type of material being processed or the particular skill of the machine operator.

Moreover, there is disclosed a unique linkage arrangement whereby the pump control arms 86, 88 and 132 may be operated in unison, yet at the same time permitting levers 86 and 132 to be actuated independently of the levers 88 in response to shifting movement of the feed roll assembly 20.

Having thus described the invention, what is claimed as new and desired to be secured by Letters Patent is:

1. In a material processing machine, apparatus including:
   a pair of adjacent assemblies having a pair of cooperating, rotatable means for conveying material therebetween, said assemblies being relatively shiftable toward and away from one another;
   a power train for rotating said rotatable means;
   a regulator associated with said power train for controlling the angular velocity of said rotatable means; and
   operating means responsive to relative shifting movement of said assemblies and coupled with said regulator in a manner to change the angular velocity of said rotatable means when said assemblies shift relative to one another,
   said regulator including a shiftable control lever coupled with said operating means, the latter means including motion dissipating means for permitting independent operation of said control lever without relatively shifting said assemblies.

2. Apparatus as claimed in claim 1, wherein said operating means includes a linkage.

3. Apparatus as claimed in claim 1, wherein said one of said assemblies is yieldably biased toward the other assembly.

4. Apparatus as claimed in claim 1, wherein said rotatable means comprises elongate feed rolls.

5. Apparatus as claimed in claim 4, wherein said power train rotates the rolls in said one assembly in a direction opposite to the rotation of the rolls in said other assembly.

6. Apparatus as claimed in claim 1, wherein said regulator includes a hydraulic pump, said power train including a hydraulic motor and fluid circuit coupled with said pump.

7. Apparatus as claimed in claim 6, wherein a second hydraulic pump, including a second shiftable control lever, is mounted adjacent said first mentioned pump for controlling a second hydraulic motor, there being a connector operably coupling said first and second control levers for in unison movement thereof to control said motors simultaneously.

8. Apparatus as claimed in claim 7, wherein said operating means includes a linkage, said connector including shiftable means to permit relative movement between said levers in response to actuation of said linkage.

9. Apparatus as claimed in claim 8, wherein a main throttle control is coupled with said levers to permit selective in unison movement thereof, said control being operable, when at rest, to restrain said second lever against movement.

10. In a material processing machine, apparatus including:
   a pair of adjacent assemblies having a pair of cooperating, rotatable means for conveying material therebetween, said assemblies being relatively shiftable toward and away from one another;
   a power train for rotating said rotatable means;
   a regulator associated with said power train for controlling the angular velocity of said rotatable means; and
   operating means responsive to relative shifting movement of said assemblies and coupled with said regulator in a manner to change the angular velocity of said rotatable means when said assemblies shift relative to one another,
   said power train including a fluid motor coupled with said structures, said regulator comprising a variable displacement fluid pump coupled in fluid flow communication with said motor for driving the latter, said pump having a control lever coupled with said operating means.

11. Apparatus as claimed in claim 10, wherein said operating means includes linkage between one of said assemblies and said lever of the pump.

12. Apparatus as claimed in claim 11, wherein said linkage includes means permitting selective manipulation of said lever by an external source of power without causing said relative shifting of said rotatable means.

13. Apparatus as claimed in claim 12, wherein said linkage includes a pair of components, said means manipulating comprising a spring-loaded, sliding connection between said components.

14. Apparatus as claimed in claim 12, wherein said linkage includes a pair of components, said means manipulating comprising a pivotal joint between said components.

15. In a material processing machine, apparatus including:

a pair of adjacent assemblies having a pair of cooperating, rotatable means for conveying material therebetween, said assemblies being relatively shiftable toward and away from one another;

a power train for rotating said rotatable means;

a regulator associated with said power train for controlling the angular velocity of said rotatable means; and operating means responsive to relative shifting movement of said assemblies and coupled with said regulator in a manner to change the angular velocity of said rotatable means when said assemblies shift relative to one another, there being a second power train and a second regulator for operating and controlling, respectively, a second drivable device independently of said assemblies, said regulators having a common primary actuator for manipulation in unison by the latter but being operably interconnected in a manner to permit selective operation of the first-mentioned regulator by relative movement of said assemblies without simultaneously operating said second regulator.

16. Apparatus as claimed in claim 15, wherein said regulators are each provided with a shiftable control lever, said levers having a lost motion connection therebetween.

17. Apparatus as claimed in claim 16, wherein said operating means includes linkage between one of said assemblies and the lever of said first-mentioned regulator, said linkage including a pair of components having a spring-loaded, relatively shiftable connection between the same for manipulation of the levers by said primary actuator without causing said shifting of the assemblies.

18. Apparatus as claimed in claim 15, wherein said regulators are each provided with a shiftable control lever, said operating mechanism including a dual function cam between the levers for transmitting motion from the lever of said second regulator to the lever of the first-mentioned regulator in response to manipulation of said second lever by said primary actuator, said cam being operable in response to said relative shifting of said assemblies to operate said first lever without operating said second lever.

19. Apparatus as claimed in claim 18, wherein said operating means includes a linkage between one of said assemblies and said cam, said linkage having a pair of components interconnected by a pivotal joint to permit manipulation of the levers by said primary actuator without transmitting said manipulation to said assemblies.

20. Apparatus as claimed in claim 18, wherein said cam is swingably mounted on said second lever in position to push said first lever during swinging of the cam by said relative movement of the assemblies.

21. Apparatus as claimed in claim 20, wherein said cam includes a roller engagable with said first lever during said swinging of the cam.

22. Apparatus as claimed in claim 21, wherein said levers are provided with means between the same and yieldably pulling said first lever toward said cam.

23. Apparatus as claimed in claim 22, wherein said power trains each include a fluid operated motor, said regulators each comprising a variable displacement fluid pump in flow communication with its motor for driving the same.

24. Apparatus as claimed in claim 15, said operating means being operable to increase the angular velocity of said rotatable means in response to movement of the latter away from one another.

25. Apparatus as claimed in claim 1, said operating means being operable to increase the angular velocity of said rotatable means in response to movement of the latter away from one another.

26. Apparatus as claimed in claim 10, said operating means being operable to increase the angular velocity of said rotatable means in response to movement of the latter away from one another.

27. Apparatus as claimed in claim 1, said operating means including a linkage between one of said assemblies and said lever, said linkage having a pair of components, said motion dissipating means comprising a spring-loaded, sliding connection between said components.

28. Apparatus as claimed in claim 1, said operating means including a linkage between one of said assemblies and said lever, said linkage having a pair of components, said motion dissipating means comprising a pivot joint between said components.

* * * * *